United States Patent
Kohri et al.

(10) Patent No.: US 9,482,985 B2
(45) Date of Patent: Nov. 1, 2016

(54) IMAGE FORMING APPARATUS, IMAGE FORMING METHOD, AND RECORDING MEDIUM STORING AN IMAGE FORMING PROGRAM

(71) Applicants: Yuusuke Kohri, Osaka (JP); Masayuki Hayashi, Osaka (JP); Motohiro Kawanabe, Osaka (JP); Yoshinori Shirasaki, Osaka (JP); Masatoshi Murakami, Osaka (JP); Akinori Yamaguchi, Osaka (JP)

(72) Inventors: Yuusuke Kohri, Osaka (JP); Masayuki Hayashi, Osaka (JP); Motohiro Kawanabe, Osaka (JP); Yoshinori Shirasaki, Osaka (JP); Masatoshi Murakami, Osaka (JP); Akinori Yamaguchi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 41 days.

(21) Appl. No.: 14/721,101

(22) Filed: May 26, 2015

(65) Prior Publication Data

US 2015/0346626 A1 Dec. 3, 2015

(30) Foreign Application Priority Data

May 27, 2014 (JP) ................. 2014-109510

(51) Int. Cl.
*G03G 15/043* (2006.01)
*B41J 2/385* (2006.01)
*H04N 1/00* (2006.01)

(52) U.S. Cl.
CPC ............. *G03G 15/043* (2013.01); *B41J 2/385* (2013.01); *H04N 1/00* (2013.01)

(58) Field of Classification Search
CPC ..... B41J 2/45; B41J 2/451; G03G 15/04036; G03G 15/326; G06K 15/1247
USPC ......... 347/118, 130, 229, 234, 235, 248–250
See application file for complete search history.

(56) References Cited

U.S. PATENT DOCUMENTS

| | | | |
|---|---|---|---|
| 2011/0026056 A1* | 2/2011 | Nakamura | G03G 15/5004 358/1.9 |
| 2011/0317190 A1* | 12/2011 | Miyake | H04N 1/00 358/1.13 |
| 2012/0062682 A1 | 3/2012 | Komai et al. | |
| 2013/0155164 A1* | 6/2013 | Kamei | G03G 15/043 347/118 |
| 2014/0153042 A1 | 6/2014 | Kawanabe et al. | |

FOREIGN PATENT DOCUMENTS

| | | |
|---|---|---|
| JP | 2012-061676 | 3/2012 |
| JP | 2014-110528 | 6/2014 |
| JP | 2014-206555 | 10/2014 |

* cited by examiner

*Primary Examiner* — Manish S Shah
*Assistant Examiner* — Roger W Pisha, II
(74) *Attorney, Agent, or Firm* — Harness, Dickey & Pierce, P.L.C.

(57) ABSTRACT

An image forming apparatus includes multiple exposure units each including multiple light emitting elements, a reading unit that reads data to be used for exposure by each one of the exposure units, one at a time from the exposure unit by the time the exposure units starts exposure, a storing unit that stores the data read by the reading unit, and a transfer unit that transfers the data stored in the storing unit to the exposure unit by the time the exposure unit starts exposure.

7 Claims, 11 Drawing Sheets

IMAGE FORMING APPARATUS, IMAGE FORMING METHOD, AND RECORDING MEDIUM STORING AN IMAGE FORMING PROGRAM

CROSS-REFERENCE TO RELATED APPLICATION

This patent application is based on and claims priority pursuant to 35 U.S.C. §119(a) to Japanese Patent Application No. 2014-109510, filed on May 27, 2014 in the Japan Patent Office, the entire disclosure of which is hereby incorporated by reference herein.

BACKGROUND

1. Technical Field

The present invention relates to an image forming apparatus, an image forming method, and a non-transitory recording medium storing an image forming program.

2. Background Art

In electrophotographic color image forming apparatuses, image forming apparatuses that expose images using a Light Emitting Diode Array (LEDA) head with multiple light emitting elements in the main scanning direction are known. In addition, a time-division light emitting control method that does not turn on all light emitting elements on the LEDA head at the same time but controls the light emission by driving the multiple light emitting elements at different times is known.

Correction data for correcting variability in light intensity of the light emitting elements is stored in a nonvolatile memory in the LEDA head. In addition, a technology that reads the correction data, writes the correction data to a static random access memory (SRAM) in a control engine temporarily before printing, and transfers the correction data from the control engine to a driver IC of the light emitting elements in the LEDA head is known. Furthermore, as illustrated in FIG. 13, a color image forming apparatus that includes a SRAM 532 that stores the light intensity correction data for all colors in a control engine 530 is known.

In the known image forming apparatus, in order to transfer the correction data for all colors from the nonvolatile memory in the head to the main memory before printing, it is desirable to transfer the correction data for all colors in parallel at high speed. This, however, lengthens down time due to read time and transfer time of the correction data to the main memory. In addition, it is required to include the SRAM for storing the light intensity correction data for all colors on an engine circuit board, thus requiring large memory space.

SUMMARY

An example embodiment of the present invention provides a novel image forming apparatus that includes multiple exposure units each including multiple light emitting elements, a reading unit that reads data to be used for exposure by each one of the exposure units, one at a time from the exposure unit by the time the exposure units starts exposure, a storing unit that stores the data read by the reading unit, and a transfer unit that transfers the data stored in the storing unit to the exposure unit by the time the exposure unit starts exposure.

Further example embodiments of the present invention provide an image forming method and a non-transitory recording medium storing an image forming program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
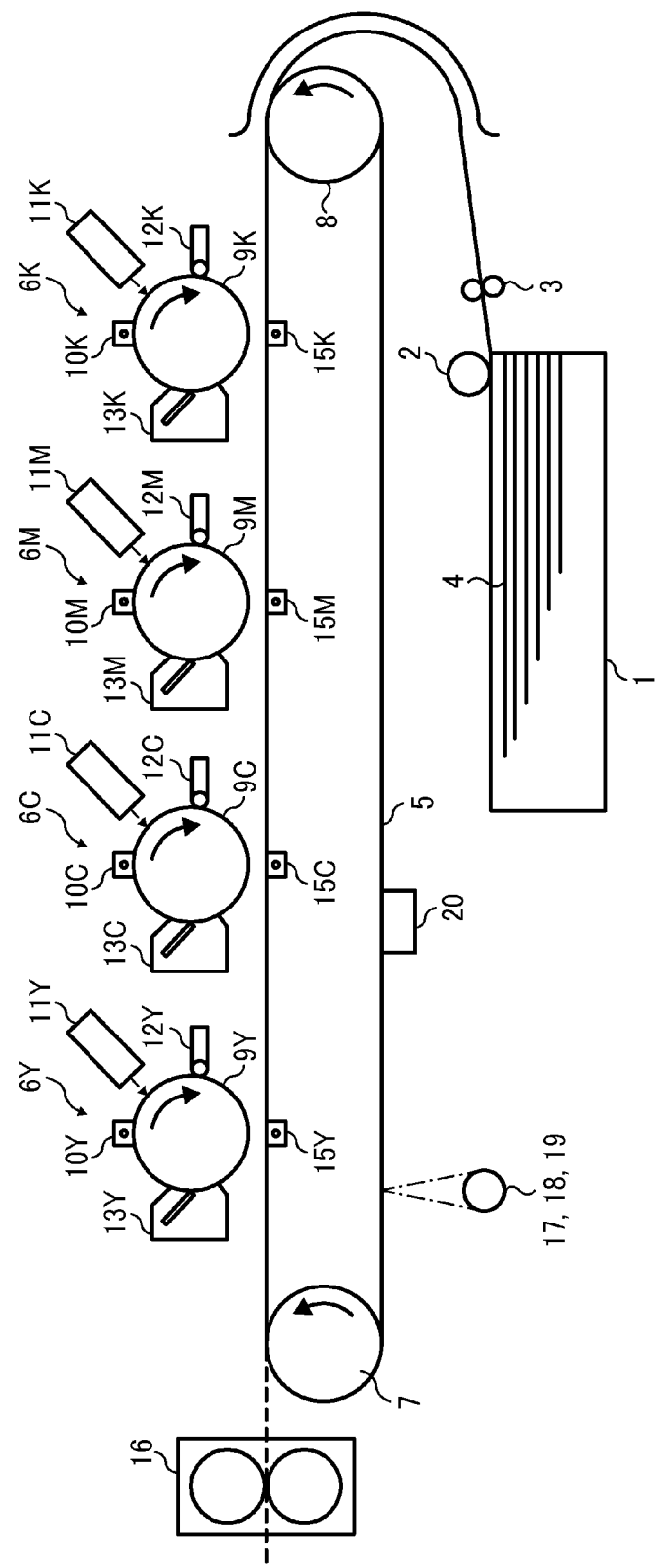
FIG. 1 is a diagram illustrating a configuration of an electrophotographic apparatus as an image forming apparatus as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the following embodiment, an image forming apparatus is described, which is capable of reducing down time due to reading and transferring predetermined data used by the exposure unit to the controller, while reducing the memory capacity in the controller.

An electrophotographic image forming apparatus (hereinafter referred to as "electrophotographic apparatus") in this embodiment is described below with reference to FIG. 1. The electrophotographic apparatus in FIG. 1 is a so-called tandem type image forming apparatus, and includes image forming units for the respective colors that are provided side by side along with the conveyance belt as an endless conveying unit.

The electrophotographic apparatus includes a conveyance belt to convey paper 4, which is fed from a paper feeding tray 1 and separated by a paper feeding roller 2 and a separation roller 3. In this case, the image forming units 6K, 6M, 6C, and 6Y are laid out along with the conveyance belt 5 in order from the upstream side in the conveying direction of the conveyance belt 5.

While colors of formed toner images are different, the image forming units 6K, 6M, 6C, and 6Y have a same inner configuration. More specifically, the image forming unit 6K forms a black image, the image forming unit 6M forms a magenta image, the image forming unit 6C forms a cyan image, and the image forming unit 6Y forms a yellow image. The configuration of the image forming unit 6K is described in detail below, and the descriptions for the configurations of the image forming units 6M, 6C, and 6Y are omitted since the configurations of the image forming units 6M, 6C, and 6Y are similar to the configuration of the image forming unit 6K.

The conveyance belt 5 is an endless belt entrained around a driving roller 7 and a driven roller 8. The driving roller 7 is driven by a driving motor, and the driving motor, the driving roller 7, and the driven roller 8 function as a driving unit that moves the conveyance belt 5 as an endless conveying unit.

In forming an image, the paper 4 contained in the paper feeding tray 1 is fed from the top sequentially and conveyed to the first image forming unit 6K by the driven conveyance belt 5 after being adsorbed to the conveyance belt 5 electrostatically, and a black toner image is transferred on the paper 4.

The image forming unit 6K consists of a photoconductor drum 9K as a photoconductor, a charging unit 10K laid out around the photoconductor drum 9K, a solid scanning head 11K, a developing device 12K, a photoconductor cleaner, and an electric charge removing unit 13K etc. The solid scanning head is configured to expose each of the image forming units 6K, 6M, 6C, and 6Y.

In forming an image, an outer surface of the photoconductor drum 9K is charged evenly in the dark by the charging unit 10K and exposed by emitted light from the solid scanning head 11K corresponding to a black image, and an electrostatic latent image is formed on the outer surface of the photoconductor drum 9K.

The electrostatic latent image is developed into a visible image using black toner by the developing device 12K, and a black toner image is formed on the photoconductor drum 9K. The toner image is transferred to the paper 4 by the transfer unit 15K at a transfer position where the photoconductor drum 9K contacts the paper 4 on the conveyance belt 5. By transferring the toner image, an image is formed on the paper 4 using the black toner.

After transferring the toner image, remaining toner on the outer surface of the photoconductor drum 9K is removed by the photoconductor cleaner. Subsequently, electric charge on the photoconductor drum 9K is removed by the electric charge removing unit 13K, and the photoconductor drum 19K waits for the next image forming process.

As described above, the paper 4 on which the black toner image is transferred by the image forming unit 6K is conveyed to the next image forming unit 6M. In the image forming unit 6M, a magenta toner image is formed on the photoconductor drum 9M by the process similar to the image forming process in the image forming unit 6K, and the toner image is superimposed on the black image formed on the paper 4.

The paper 4 is further conveyed to the next image forming units 6C and 6Y, and similarly, the cyan toner image formed on the photoconductor drum 9C and the yellow toner image formed on the photoconductor drum 9Y are superimposed on the paper 4.

As described above, a full color image is formed on the paper 4. After the superimposed full color image is formed, the paper 4 is removed from the conveyance belt 5. Subsequently, the image on the paper 4 is fixed by the fixing unit 16, and the paper 4 is ejected outside of the image forming apparatus.

Figure 2:
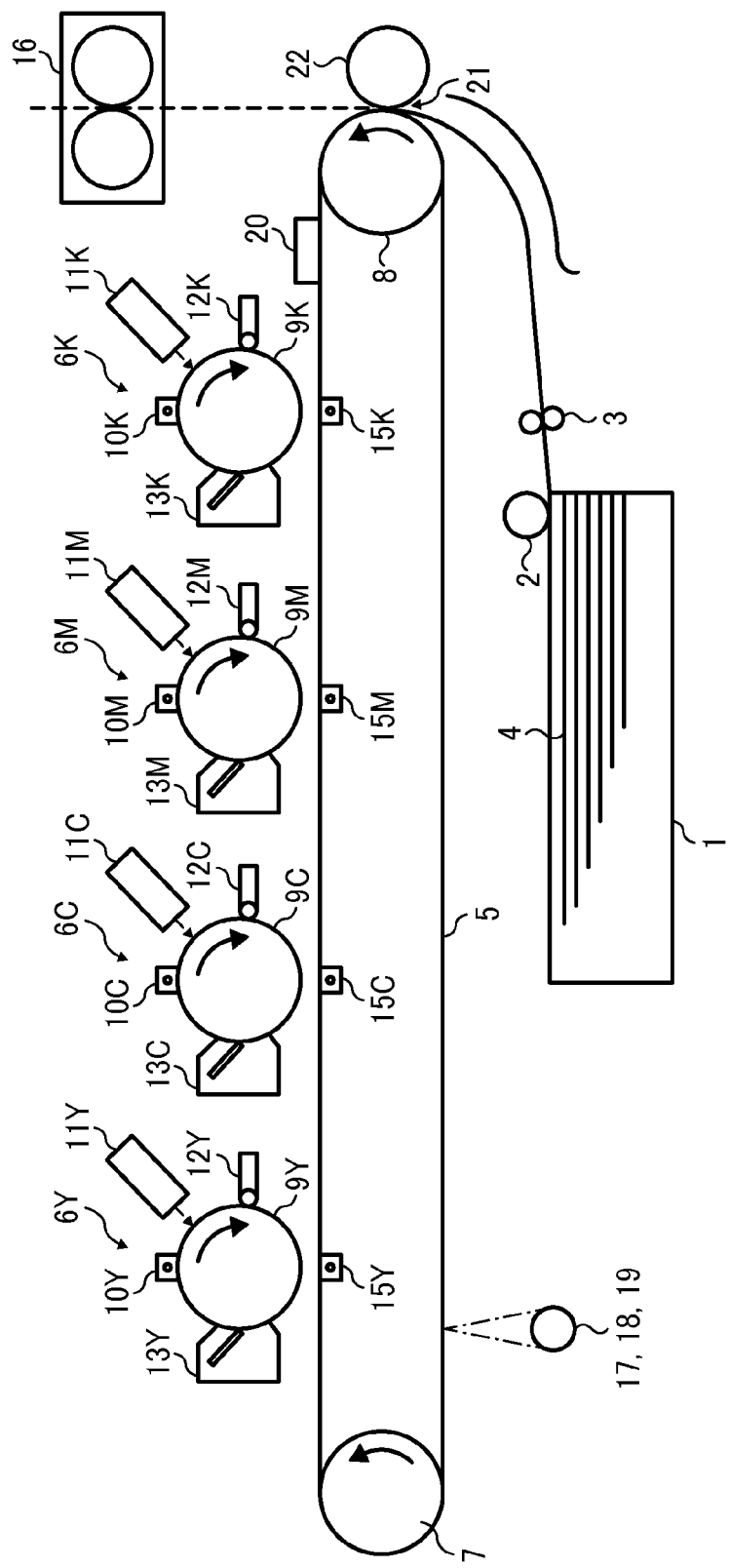
FIG. 2 is a diagram illustrating a configuration of another electrophotographic apparatus as an image forming apparatus as an embodiment of the present invention.

Next, another example of the electrophotographic apparatus as the image forming apparatus in this embodiment is described below with reference to FIG. 2. In FIG. 2, the electrophotographic apparatus adopts an intermediate transfer belt 5 as the endless conveying unit instead of the conveyance belt. The intermediate transfer belt 5 is an endless belt entrained around a driving roller 7 and a driven roller 8.

Toner images for the respective colors are transferred on the intermediate transfer belt 5 at the first transfer position where the photoconductor drums 9K, 9M, 9C, and 9Y contact the intermediate transfer belt 5 by the transfer units 15K, 15M, 15C, and 15Y. By the transfer described above, the full color image on which toner images for the respective colors are superimposed is formed on the intermediate transfer belt 5.

In forming the image, the paper 4 contained in the paper feeding tray 1 is fed from the top sequentially and conveyed on the intermediate transfer belt 5. Subsequently, the full color toner image is transferred on the paper 4 at the second transfer position where the intermediate transfer belt 5 contacts the paper 4.

A second transfer roller 22 is located at the second transfer position, and transfer efficiency is enhanced by pressing the paper 4 to the intermediate transfer belt 5 by the second transfer roller 22. The second transfer roller 22 clings to the intermediate transfer belt 5 without the separation mechanism.

Figure 3:
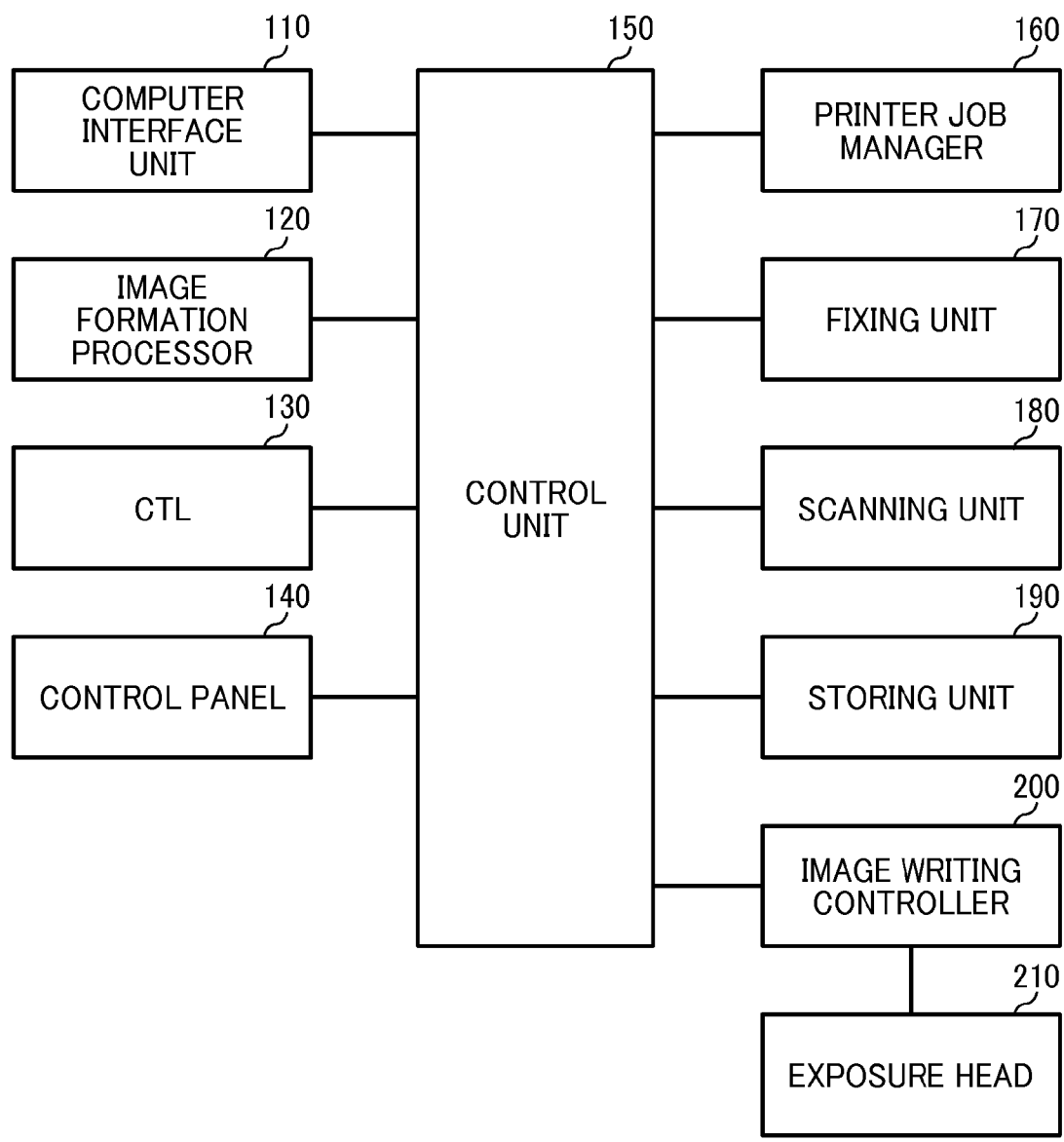
FIG. 3 is a block diagram illustrating a functional configuration of the image forming apparatus as an embodiment of the present invention.

Next, functional blocks of the image forming apparatus in this embodiment are described below with reference to FIG. 3. The image forming apparatus in this embodiment includes a computer interface unit 110, an image formation process unit 120, a controller 130, an operational unit 140, and a control unit 150 as functional blocks In addition, the image forming apparatus further includes a printer job management unit 160, a fixing unit 170, a scanning unit 180, a storage unit 190, and an image writing control unit 200.

The computer interface unit 110 communicates with an information processing apparatus such as a computer that transfers a print request and print data to the image forming apparatus via a network.

The image formation process unit 120 is implemented by the paper feeding tray 1, the conveyance belt 5, the image forming units 6K, 6M, 6C, and 6Y etc. in the electrophotographic apparatus described above for example and forms an image on the paper P by electrophotography method. In addition, if position shift etc. is detected in forming an image, it is corrected.

The controller 130 sends image data transferred by the information processing apparatus via the network and image data scanned by the scanning unit 180 to the control unit 150 and requests printing.

The operational unit 140 includes various operational keys on which various operations are performed to instruct the image forming apparatus to perform the image forming process and a liquid crystal display for example. On the operational unit 140, various commands such as the number of printed copies desired for operating the image forming apparatus are input using the operational keys. In addition, commands input using the operational keys and information to report are displayed on the liquid crystal display.

The operational unit 140 outputs the content of the operation to the control unit 150 and displays the various information described above on the display under the control of the control unit 150.

The control unit 150 controls the whole image forming apparatus to perform basic functions as the image forming apparatus and perform an image forming control process in this embodiment. For example, the control unit 150 includes a central processing unit (CPU), a read only memory (ROM), and a random access memory (RAM) etc.

In the control unit 150, an operating system as the image forming apparatus, a program for controlling data transfer (described later), and various data desired for executing these programs are stored in the ROM preliminarily. In the control unit 150, the CPU uses the RAM as a work memory based on the programs in the ROM to control the whole image forming apparatus, execute the basic process as the image forming apparatus, and execute a process for controlling data transfer (described later) in this embodiment.

The print job management unit 160 accepts the print request requested to the image forming apparatus and the print data as a print job, manages an executing order of the print jobs, and manages print execution.

As described above, the fixing unit 170 conveys the paper 4 on which the toner image is transferred by the image formation processing unit 120 heating and pressing to fix the toner image on the paper 4.

For example, the scanning unit 180 includes a line image sensor using charge couple device (CCD), and the scanning unit 180 generally includes an automatic document feeder (ADF). A multi-page document is set on the ADF and the ADF conveys the pages one by one to a document scanning position of the scanning unit 180. The scanning unit 180 scans the pages conveyed by the ADF to scan the image on the page at a predetermined resolution and outputs the scanned image to the control unit 150.

The storing unit 190 corresponds to a nonvolatile memory, etc., and stores various parameters for operating the image forming apparatus.

The image writing control unit 200 converts the image data transferred by the controller 130 into an exposure signal for activating the LED on the LEDA head as the exposure head 210 of the solid scanning head in the image formation processing unit 120 to control activation of each of the LEDs on the LEDA head individually. The image writing control unit 200 controls transferring signals such as image data and correction data (described later) for the LEDA head.

Figure 4:
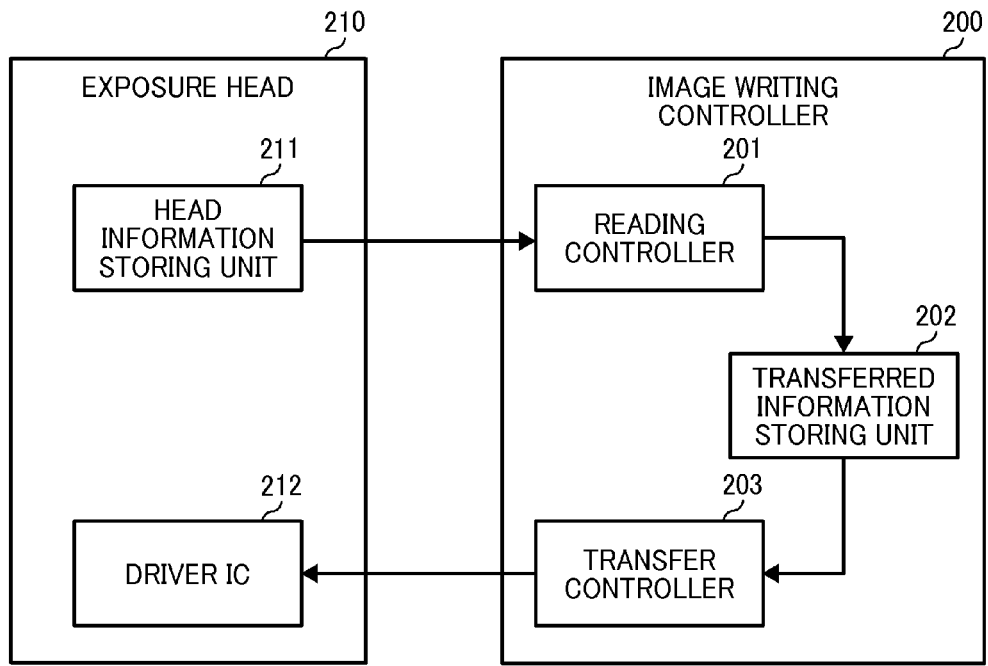
FIG. 4 is a diagram illustrating a relationship between an exposure head and a controller as an embodiment of the present invention.

Next, relationship between the exposure head 210 as the exposing unit and the image writing control unit 200 in this embodiment is described below with reference to FIG. 4. The exposure head 210 includes a head information storing unit 211 and a driver IC 212. In addition, the image writing control unit 200 further includes a reading control unit 201, a transfer information storing unit 202, and a transfer controller 203.

The exposure head 210 in this embodiment is an LEDA head for each color Y, C, M, and Bk described above, for example, as two or more exposure units on which multiple light emitting elements are laid out in the main scanning direction, for example.

The head information storing unit 211 stores characteristic data as predetermined data used in exposure by the exposure head 210. Examples of the characteristic data include light intensity correction data for correcting differences in light emission intensity between the light emitting elements on each of the exposure heads 210 and unique-data other than the light intensity correction data. The eigen-data is small compared to the light intensity correction data and includes parity data or checksum data for checking transfer errors, for example.

The driver IC 212 functions as an illumination drive control unit to illuminate each of the light emitting elements described above. In this embodiment, for example, an electronically erasable and programmable read only memory (EEPROM) is adopted as the head information storing unit 211.

The reading control unit 201 functions as a reading unit that reads the light intensity correction data and eigen-data in each of the LEDA heads from the head information storing unit 211 by the time each of the LEDA heads starts exposing.

The transfer information storing unit 202 stores each of the data described above read by the reading control unit 201.

The transfer controller 203 transfers each of the data stored in the transfer information storing unit 202 described above to the driver IC 212 in each of the LEDA heads before starting the exposure.

In this embodiment, the correction data for one color only is read in the memory in the control unit within image formation time between each color and transferred serially before starting the image formation for each color. As a result, down time due to reading and transferring data such as the light intensity correction data does is suppressed. In addition, since large memory area for storing data for all colors, Y, C, M, and Bk in the control unit is unnecessary, it is possible to reduce memory area compared to the known technology.

First Embodiment

Figure 5:
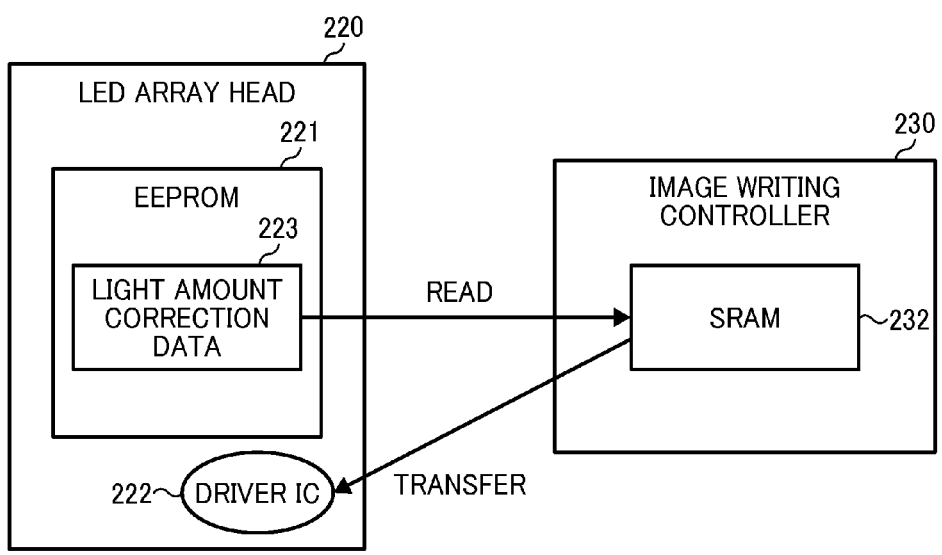
FIG. 5 is a diagram illustrating reading and transferring of light intensity correction data as a first embodiment of the present invention.

FIG. 5 is a diagram illustrating reading and transferring of light intensity correction data in this embodiment. In this embodiment, the light intensity correction data 223 stored in the EEPROM 221, which functions as the head information storing unit 211 of the LEDA head 220, is read into the control engine before starting the image formation.

More specifically, the light intensity correction data 223 in the target LEDA head 220 is read in a static RAM (SRAM) for example as the transfer information storing unit 202 in the image writing control unit 230 before starting the image formation for each color. Subsequently, the data is transferred to the driver IC 222 in the target LEDA head 220 before image formation starts for each color.

Figure 6:
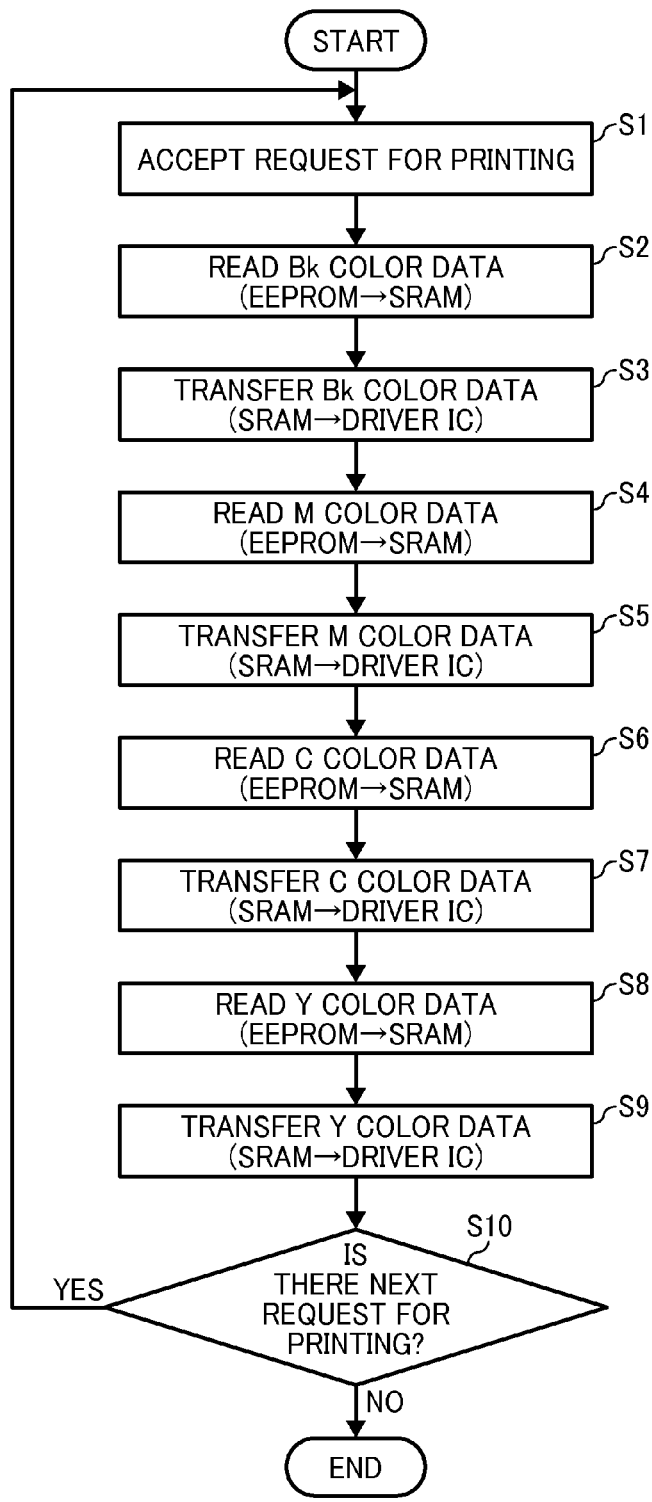
FIG. 6 is a flowchart as the first embodiment of the present invention.

FIG. 6 illustrates an example operation of reading and transferring the light intensity correction data 223 from the LEDA head 220.

The print job management unit 160 accepts a print request in S1. The image writing control unit 230 reads the light intensity correction data 223 for Bk as the first color from the EEPROM 221 in the LEDA head 220 and stores it in the SRAM 232 in S2. Subsequently, the image writing control unit 230 transfers the light intensity correction data 223 for Bk from the SRAM 232 to the driver IC 222 in S3.

Next, just like color Bk, the light intensity correction data 223 for color M as the second color is read and transferred in S4 and S5, the light intensity correction data 223 for color C as the third color is read and transferred in S6 and S7, and the light intensity correction data 223 for color Y as the fourth color is read and transferred in S8 and S9 serially and sequentially. It should be noted that the memory area in the SRAM 232 is released after transferring the light intensity correction data 223 etc. to the driver IC 222.

Next, if there is next print request (YES in S10), the print job management unit 160 accepts the print request again in S1. By contrast, if there is no next print request (NO in S10), the process ends.

An image forming sequence in transferring the light intensity correction data 223 for each color and operating status of each of the LEDA heads 220 is described below with reference to FIG. 7. The image forming sequence is illustrated in the upper part of FIG. 7, and the operating status of each of the LEDA heads 220 is illustrated in the lower part of FIG. 7. In this embodiment, each of the LEDA heads 220 do not work until the light intensity correction data 223 etc. is transferred and is in standby mode such as an energy-saving mode.

For example, in the LEDA head 220 corresponding to color Bk, before starting forming an image in Bk in the energy-saving mode, the light intensity correction data 223 etc. corresponding to color Bk are read in the SRAM 232, and it is transferred from the SRAM 232 to the LEDA head 220. Subsequently, after predetermined ready time, the LEDA head 220 transitions to an image formation status.

In the above description, since the SRAM 232 is released after reading and transferring the data corresponding to color Bk, the light intensity correction data 223 etc. corresponding to color M whose image is to be formed next is read in the SRAM 232 before starting forming an image in color M, and the data is transferred from the SRAM 232 to the LEDA head 220. Regarding the subsequent colors C and Y, the light intensity correction data 223 is read in the SRAM 232 similarly, and the data is transferred from the SRAM 232 to the LEDA head 220.

Figure 8:
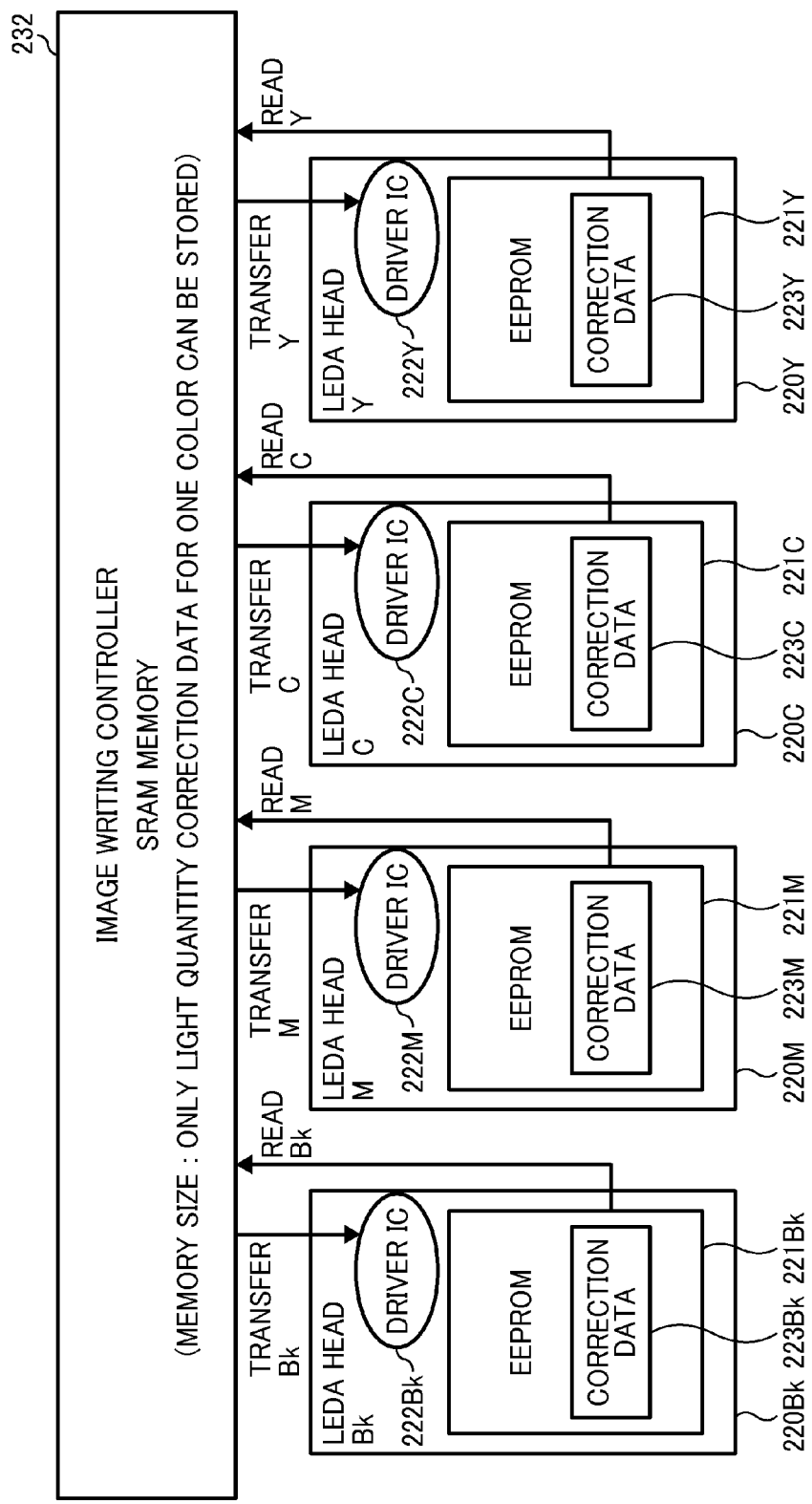
FIG. 8 is a diagram illustrating reading of the light intensity correction data for all colors and transferring of light intensity correction data for all colors to the LEDA head as the first embodiment of the present invention.

FIG. 8 is a diagram illustrating reading of the light intensity correction data 223 for all colors and transferring of light intensity correction data 223 for all colors to the LEDA head 220 in this embodiment. As described above, in this embodiment, the data for each color is read in the SRAM 232 in the image writing controller 230 and subsequently transferred to the LEDA head 220.

As described above, in this embodiment, since it is enough that the SRAM in the image writing controller 232 in the control engine stores the light intensity correction data for one color only at a time, it is possible to reduce the size of the SRAM.

Second Embodiment

The second embodiment in the present invention is described below with reference to FIG. 9. In this embodiment, a calculation unit described below is included compared to the configuration in the first embodiment. That is, the calculation unit calculates read time to read data in the head information storing unit 211 in the exposure head 210 by the reading controller 201 and transfer time to transfer the data to the exposure head 210 by the transfer controller 203. Here, the calculation unit calculates the transfer time before the transfer. The calculation unit may be realized by the transfer controller 203. More specifically, the read time and the transfer time are calculated using following equations.

$$\text{read time} = \frac{\text{correction data size for one color}}{\text{read rate from } EEPROM \text{ to } SRAM}$$

-continued $$\text{transfer time} = \frac{\text{correction data size for one color}}{\text{transfer rate from } SRAM \text{ to driver } IC}$$

Next, the transfer controller 203 transfers the data to the exposure head 210 at transfer timing corresponding to the read time or the transfer time calculated by the calculation unit described above. That is, in this embodiment, data transfer timing in the LEDA head as the exposure head 210 is different from the first embodiment.

More specifically, the read time and the transfer time for the data in the head information storing unit 211 for each color are calculated preliminarily by the calculation unit described above. Subsequently, the data for the first color is read and transferred after waiting for timing when data transfer is finished before starting forming an image for the first color. Similarly, the data for the second color and subsequent colors is read and transferred after waiting for timing when data transfer is finished before starting forming an image for the corresponding color.

A process that determines timing of starting transferring is described below. It is desired to finish transferring the light intensity correction data for the Nth color by the time of starting forming an image for the Nth color. In this case, if the transfer timing is determined so that the data transfer finishes just before starting forming the image for the Nth color, it is possible to reduce power consumption. Therefore, the transfer timing determination unit determines the timing of starting transferring data going back the transfer time described above from the time of finishing transferring.

Figure 7:
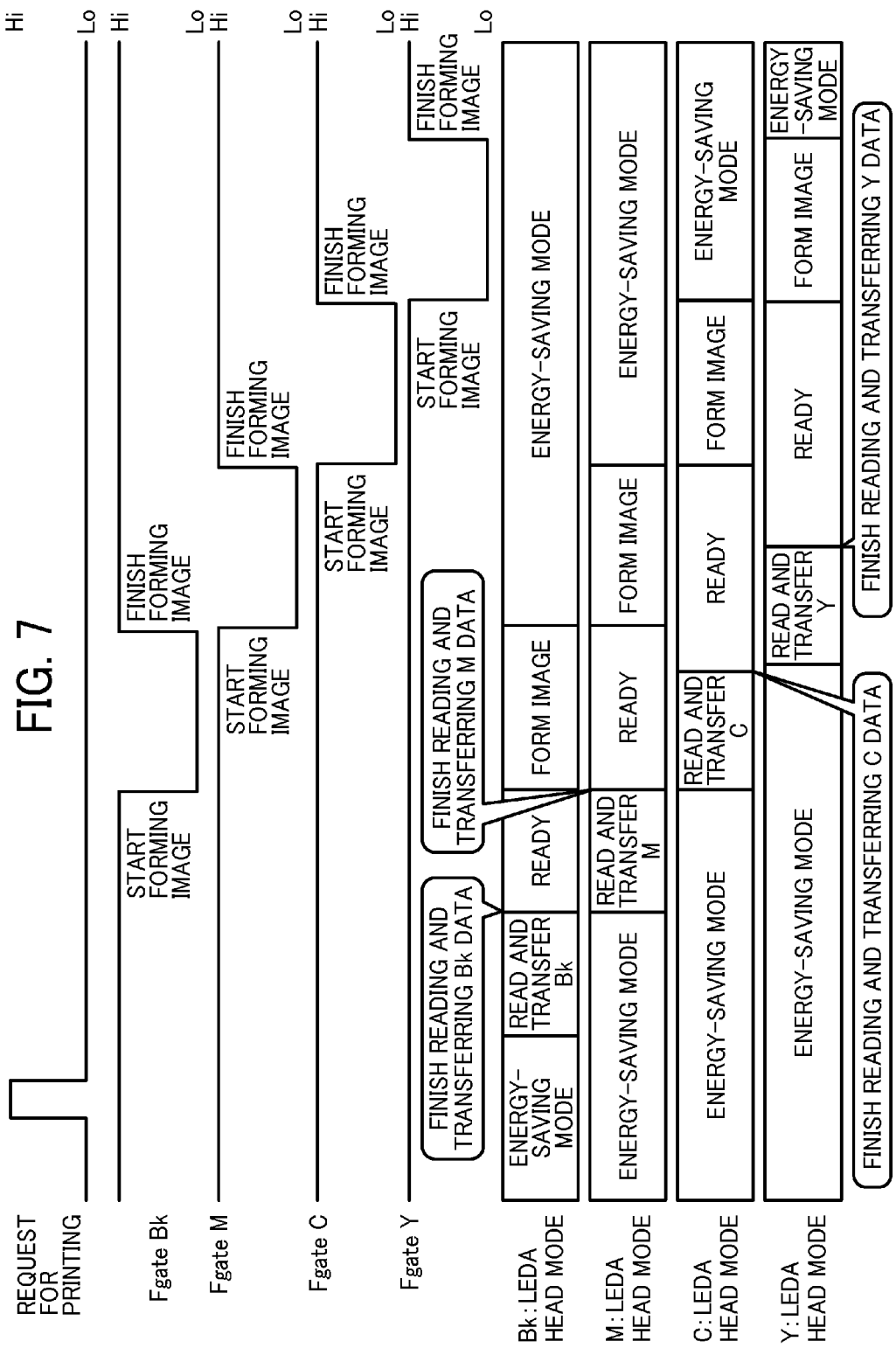
FIG. 7 is a diagram illustrating a corresponding relationship between an image forming sequence and operational status of the LEDA heads for each color as the first embodiment of the present invention.
Figure 9:
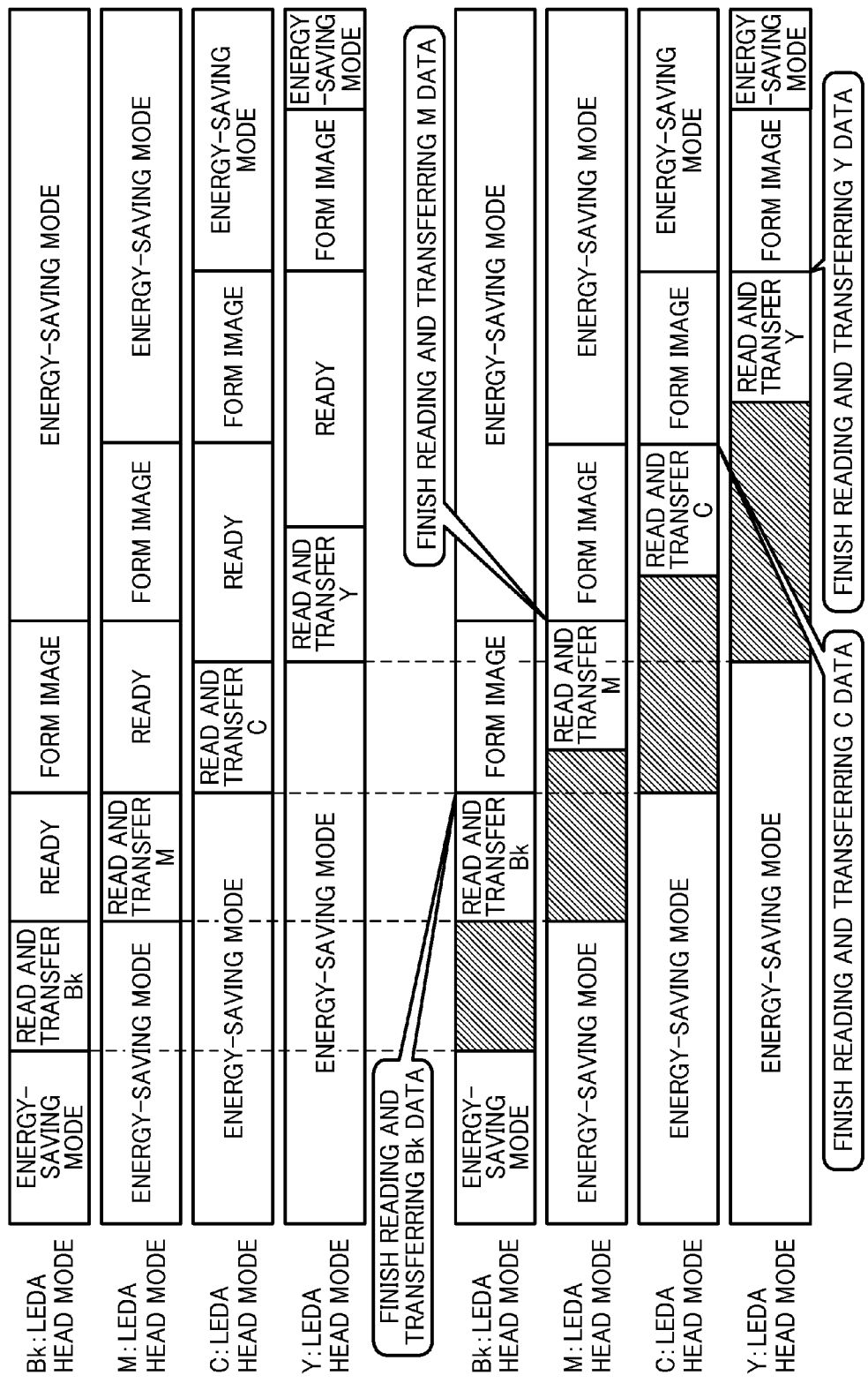
FIG. 9 is a diagram illustrating operational status of the LEDA heads for each color as a second embodiment of the present invention.

The operating status of each of the LEDA heads in FIG. 7 in the first embodiment is illustrated in the upper part of FIG. 9, and the operating status of each of the LEDA heads is illustrated in the lower part of FIG. 9. In this embodiment, the LEDA heads for each color wait in the energy-saving mode until limit timing when data transfer to the head information storing unit 211 for the corresponding color is finished before starting forming an image.

That is, since the data is read and transferred at timing of forming an image for each color, wait time (ready time) from reading/transferring data to forming an image in the first embodiment is unnecessary, and time for the energy-saving mode can be increased (shaded portions in FIG. 9). Consequently, it is possible to save energy more appropriately in this embodiment compared to the first embodiment.

Each of the LEDA heads is in the energy-saving mode until data is read/transferred to reduce power consumption. Therefore, time for the energy-saving mod can be increased more appropriately by calculating the data read time and transfer time preliminarily and waiting for reading/transferring data until the timing of forming an image as in the case in this embodiment.

If the energy-saving mode can be maintained while reading data from the head information storing unit 211 in the LEDA head, it is possible to "transfer" the light intensity correction data only at the timing described above. In this case, it is possible to "read" the light intensity correction data just after finishing transferring the light intensity correction data for the previous color. In this embodiment, since the time in which the LEDA head stands by as the energy-saving mode can be extended, it is possible to save energy more appropriately.

Third Embodiment

In this embodiment, it is possible to include further a transfer timing determination unit in addition to the embodiments described above. The transfer timing determination unit determines transfer timing based on the comparison between the transfer time calculated by the calculation unit described above and the time difference of forming an image among the LEDA heads or exposing. An image writing controller 330 in FIG. 10, a SRAM 331 in FIG. 12, and the control engine 530 in FIG. 13 cooperate each other to implement the transfer timing determination unit.

More specifically, in the third embodiment, the transfer time for the light intensity correction data for one color is calculated preliminarily, and it is determined whether the data for each color is transferred sequentially as in the first embodiment or the wait time is spent between each color prioritizing energy-saving as in the second embodiment. The comparison result between the calculated transfer time and time difference of forming an image among each LEDA head is used as basis of the determination.

For example, if the data transfer time for one color is shorter enough than the time difference of forming an image among each color, the control in the second embodiment is performed prioritizing energy-saving. By contrast, if the data transfer time is near to the time difference of forming an image among each color and there is not enough time, the control in the first embodiment is performed. In this embodiment, since the apparatus determines the transfer timing automatically, it is possible to transfer data more efficiently along with saving energy.

Fourth Embodiment

Figure 10:
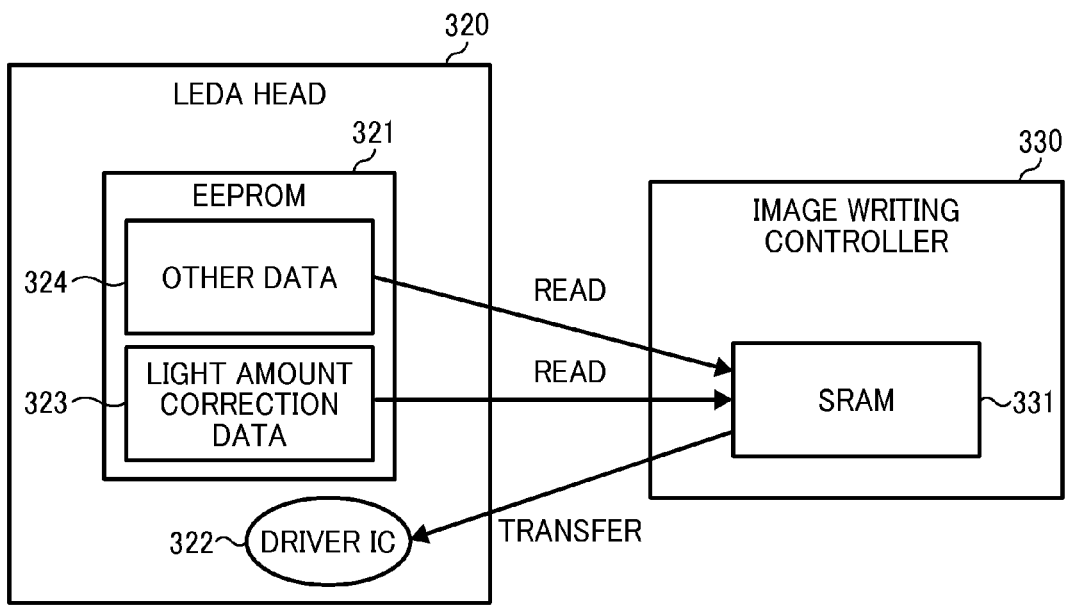
FIG. 10 is a diagram illustrating reading and transferring of light intensity correction data and other data as a fourth embodiment of the present invention.
Figure 11:
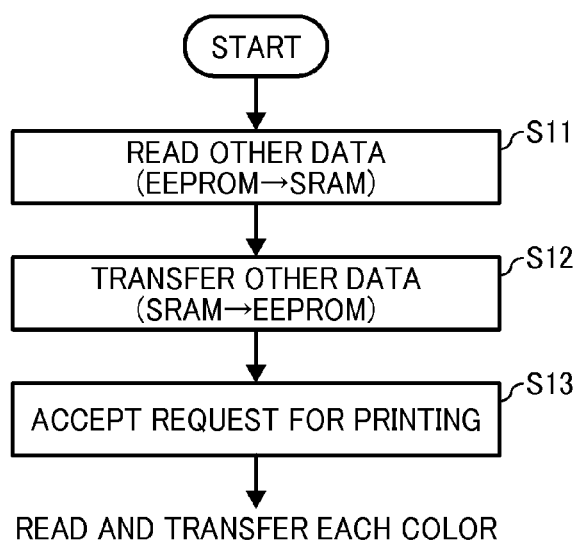
FIG. 11 is a flowchart as the fourth embodiment of the present invention.
Figure 12:
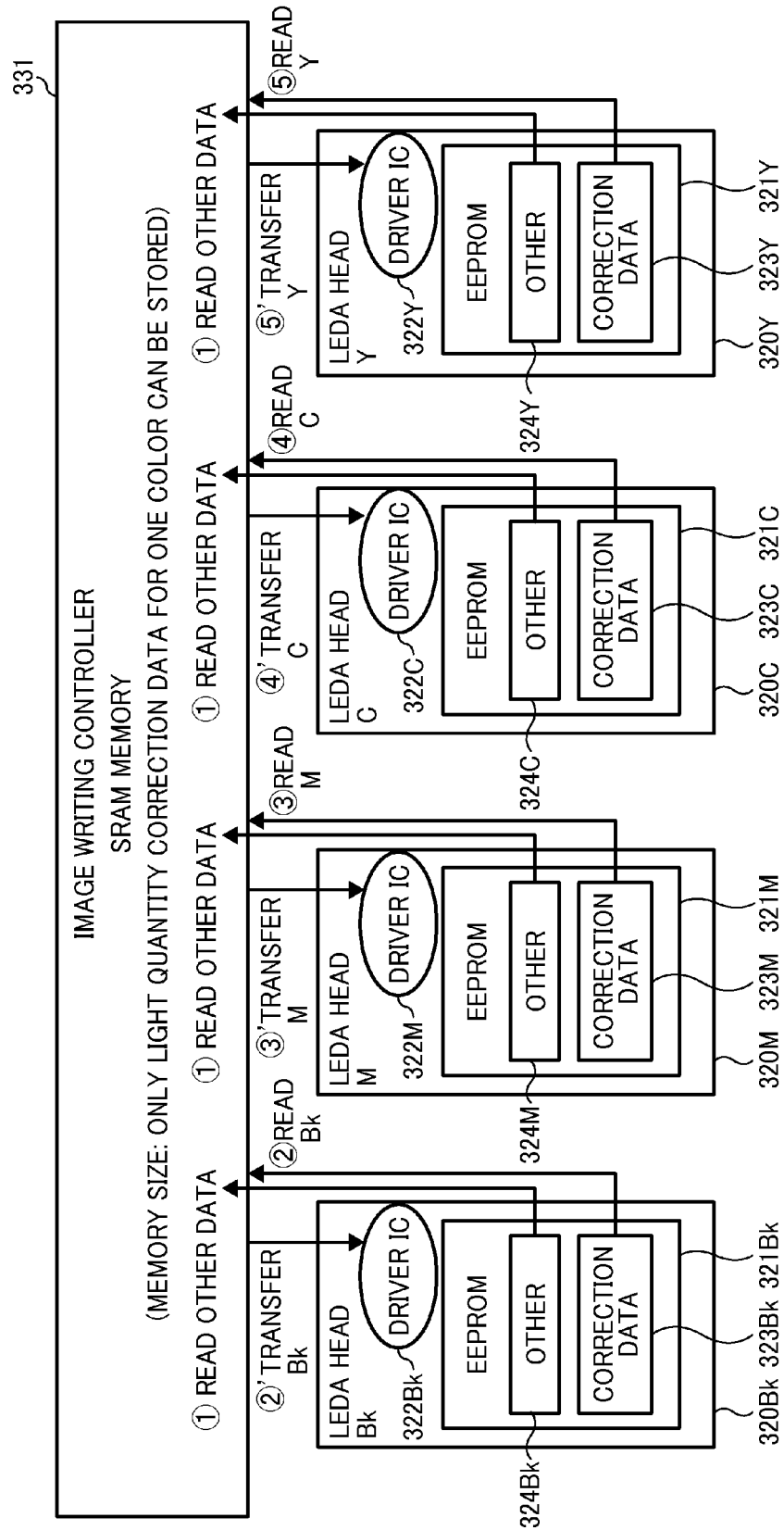
FIG. 12 is a diagram illustrating reading of the light intensity correction data for all colors and transferring of light intensity correction data for all colors to the LEDA head as the fourth embodiment of the present invention.
Figure 13:
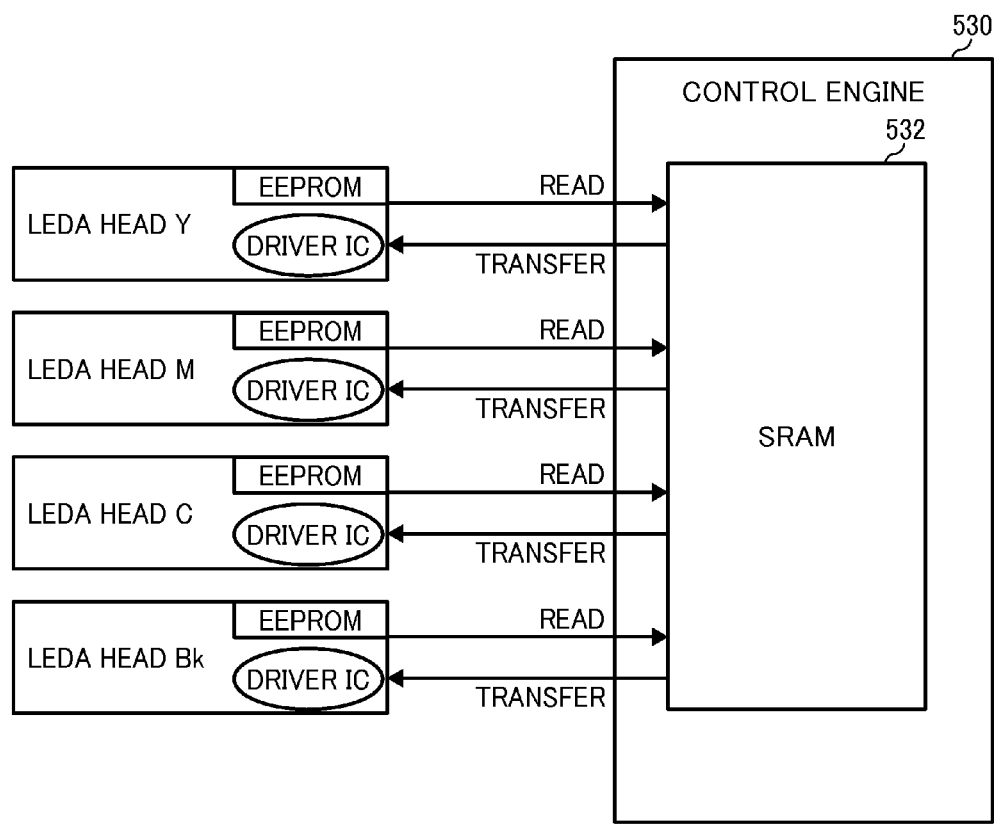
FIG. 13 is a diagram illustrating reading and transferring of light intensity correction data as a prior art.

The fourth embodiment in the present invention is described below with reference to FIGS. 10 to 12. As shown in FIG. 10, in this embodiment, in addition to the light intensity correction data 323, the EEPROM 321 stores other data 324 smaller than the light intensity correction data 323. FIG. 12 is a diagram corresponding to FIG. 8 in the first embodiment described above illustrating transfer of the other data 324 prior to the light intensity correction data 323 in this embodiment.

The other data 324 indicates the characteristics of the LEDA head. Examples of the other data 324 are LEDA head type data, Y warp data, light intensity data, head length data, head serial number data, and LED offset shift data etc. Usually, the light intensity correction data makes up about 80%, and the other data makes up about 20%. As described in this embodiment, by storing the other data 324 in the EEPROM 321, it is possible to prevent from reading the other data 324 many times and maintain the data after turning the power off.

In this embodiment, in the image writing controller 330, the other data described above for all LEDA heads is read in the SRAM 331 before starting exposure using one of the LEDA head. Subsequently, before starting exposure using one of the LEDA heads, the image writing controller 330 transfers other data to all LEDA heads.

In this embodiment, timing for transferring the other data 324 among data stored in the EEPROM 321 is different from the other embodiments described above. Data transfer control sequence is described below with reference to FIG. 11.

First, after turning on the power of the image forming apparatus, the other data 324 for all colors is read from the EEPROM 321 to the SRAM 331 in S11. Subsequently, the read other data 324 for all colors is transferred to the EEPROM 321 in S12. After accepting a request for printing in S13, the light intensity correction data for each color is read and transferred just like the sequences in the embodiments described above, and the description is omitted.

In this embodiment, it is possible to shorten the read time and the transfer time for the light intensity correction data further in addition to advantages described in the above embodiments. That is, while the light intensity correction data and the other data are transferred between successive image forming operations for each color in the first embodiment, only the light intensity correction data is transferred in the fourth embodiment.

In addition, by shortening the data read time and transfer time, it is possible to enhance capability of the apparatus if printing speed is improved or time between successive image forming operations gets short by narrowing paper interval. Furthermore, in this embodiment, since it is preferable that the SRAM be large enough to accommodate the light intensity correction data, it is possible to reduce the memory size more appropriately.

Fifth Embodiment

The fifth embodiment in the present invention is described below. In this embodiment, for example, in case of forming two or more images, in another image forming process performed after one image forming process, the light intensity correction data for the exposure head used in the former image forming process is read during the latter image forming process.

In this embodiment, data firstly read in the next image forming process (hereinafter referred to as "next job") is read prior to the next job after finishing reading/transferring data stored in the EEPROM in the LEDA heads for all colors in one image forming process (hereinafter referred to as "present job"), and that is the difference from the embodiments described above.

That is, for example, while the present job is processed, prior to the next job, the data for the first color is read and stored in the SRAM. As a result, it is unnecessary to read the data for the first color in the next job. Therefore, in this embodiment, for example, it is possible to start the process from transferring data for the first color, and it is possible to reduce the total process time. It should be noted that the case described above is just an example. Therefore, if the process time for the present job is long enough, it is possible to read not only the data for one color but also the data for more than two colors in advance during the present job.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. An image forming apparatus, comprising:
multiple exposure units each including multiple light emitting elements; and
a controller configured to,
sequentially select each of multiple exposure units as a selected exposure unit, and
control the multiple exposure units in a time division manner by,
reading, from the selected exposure unit, data used for exposure by the selected exposure unit such that the data associated with the selected exposure unit is read by the time the selected exposure unit starts exposure,
storing, in a memory, the read data, and
transferring the stored data to the selected exposure unit such that the data associated with the selected exposure unit is transferred by the time the selected exposure unit starts exposure.

2. The image forming apparatus according to claim 1, wherein the controller is further configured to,
calculate preliminarily a read time to read the data from the selected exposure unit and a transfer time to transfer the data to the selected exposure unit, and
transfer the data to the selected exposure unit at a transfer timing determined in accordance with the read time and the transfer time.

3. The image forming apparatus according to claim 2, wherein the controller is further configured to determine the transfer timing by comparing the transfer time and differences in exposure time of the multiple exposure units.

4. The image forming apparatus according to claim 2, wherein:
the data includes correction data for correcting differences in light intensity between the light emitting elements in each of the multiple exposure units and other data smaller than the correction data, and
the controller is configured to,
read the other data for all of the exposure units by the time the selected exposure unit starts exposing;
transfer the other data for all of the exposure units to all of the exposure units by the time the selected exposure unit starts exposing.

5. The image forming apparatus according to claim 1, wherein, in a case in which at least a first image forming operation and a second image formation operation are performed sequentially, the controller is configured to read the data to be used by at least one of the exposure units that exposes first in the second image formation operation during the first image formation operation being performed.

6. A method of forming an image, the method comprising:
sequentially selecting each of multiple exposure units as a selected exposure unit; and
controlling the multiple exposure units in a time division manner by,
reading, from the selected exposure unit, data used for exposure by the selected exposure unit such that the data associated with the selected exposure unit is read by the time the selected exposure unit starts exposure, the multiple exposure units each including multiple light emitting elements,
storing the read data in a memory, and
transferring the stored data to the selected exposure unit such that the data associated with the selected exposure unit is transferred to the selected exposure unit by the time the selected exposure unit starts exposure.

7. A non-transitory, computer-readable recording medium storing a program that, when executed by a processor, causes the processor to implement a method of forming an image, the method comprising:
sequentially selecting each of multiple exposure units as a selected exposure unit; and
controlling the multiple exposure units in a time division manner by,
reading, from the selected exposure unit, data used for exposure by the selected exposure unit such that the data associated with the selected exposure unit is read by the time the selected exposure unit starts exposure, the multiple exposure units each including multiple light emitting elements,
storing the read data in a memory; and
transferring the stored data to the selected exposure unit such that the data associated with the selected exposure unit is transferred to the selected exposure unit by the time the selected exposure unit starts exposure.

* * * * *